United States Patent
Kenington

(10) Patent No.: US 8,140,007 B2
(45) Date of Patent: Mar. 20, 2012

(54) RADIO SYSTEM AND METHOD FOR RELAYING RADIO SIGNALS WITH A POWER CALIBRATION OF TRANSMIT RADIO SIGNALS

(75) Inventor: Peter Kenington, Chepstow (GB)

(73) Assignee: Ubidyne, Inc., Wilmington, DE (US)

( * ) Notice: Subject to any disclaimer, the term of this patent is extended or adjusted under 35 U.S.C. 154(b) by 441 days.

(21) Appl. No.: 12/416,630

(22) Filed: Apr. 1, 2009

(65) Prior Publication Data

US 2010/0255774 A1    Oct. 7, 2010

(51) Int. Cl.
   *H04B 7/185* (2006.01)
   *H04B 17/00* (2006.01)
(52) U.S. Cl. ............... 455/13.4; 45/67.11; 45/115.1
(58) Field of Classification Search ............. 455/7, 13.4, 455/67.1, 115.1, 67.11
   See application file for complete search history.

(56) References Cited

U.S. PATENT DOCUMENTS

| | | | |
|---|---|---|---|
| 4,415,418 A | 11/1983 | Turre et al. | |
| 5,989,402 A | 11/1999 | Chow et al. | |
| 6,157,343 A | 12/2000 | Andersson et al. | |
| 6,704,579 B2 * | 3/2004 | Woodhead et al. | 455/522 |
| 6,711,388 B1 * | 3/2004 | Neitiniemi | 455/127.1 |
| 7,409,191 B2 * | 8/2008 | Azuma | 455/103 |
| 7,457,590 B2 * | 11/2008 | Frank | 455/69 |
| 2003/0236107 A1 | 12/2003 | Azuma | |
| 2004/0204098 A1 | 10/2004 | Owen | |
| 2005/0282506 A1 | 12/2005 | Azuma | |
| 2007/0051628 A1 | 3/2007 | Dolnik | |
| 2008/0095266 A1 | 4/2008 | Rashev et al. | |
| 2009/0034651 A1 | 2/2009 | Lan et al. | |
| 2010/0166109 A1 | 7/2010 | Neumann et al. | |
| 2010/0166110 A1 | 7/2010 | Neumann et al. | |

FOREIGN PATENT DOCUMENTS

| | | |
|---|---|---|
| DE | 202005009960 | 9/2005 |
| EP | 0295942 | 12/1988 |
| EP | 1120858 | 8/2001 |
| EP | 1389837 | 2/2004 |
| EP | 1486778 | 12/2004 |
| EP | 1543935 | 6/2005 |
| EP | 1608082 | 12/2005 |

(Continued)

OTHER PUBLICATIONS

Patient Test Procedure Brochure, www.ReliaLAB.com, printed Jun. 2005, 7 pages.

(Continued)

*Primary Examiner* — Hai L Nguyen
(74) *Attorney, Agent, or Firm* — Stephen H. Eland; Dann, Dorfman, Herrell & Skillman

(57) ABSTRACT

The present invention provides a radio system and a method for relaying radio signals, providing a power calibration of transmit radio signals. With the radio system and the method no dedicated calibration signal generator is required for providing the power calibration of the transmit radio signals. The radio system comprises at least one transmit path, a calibration unit at the least one link and a power sensor. A selected one of coupled transmit signals is forwarded to a power sensor for measuring a power level of a portion of the selected one of the coupled transmit signals, wherein the calibration unit is adapted to update a power rating of the at least one transmit path in response to the transmit power level of the selected one of the coupled transmit signals.

27 Claims, 8 Drawing Sheets

FOREIGN PATENT DOCUMENTS

| | | |
|---|---|---|
| EP | 1120858 | 4/2007 |
| EP | 1649614 | 11/2010 |
| JP | 2005331411 | 12/2005 |
| WO | 96/15585 | 5/1996 |
| WO | 96/33405 | 10/1996 |
| WO | 03/019773 | 3/2003 |
| WO | 2010/038227 | 4/2010 |

OTHER PUBLICATIONS

Vrouwe et al, Direct Measurement of Lithium in Whole Blood Using Microchip Capillary Electrophoresis With Integrated Conductivity Detection (XP-002447049), Electrophoresis, 2004, 25, pp. 1660-1667.

Vrouwe et al, Microchip Analysis of Lithum in Blood Using Movin Boundary Electrophoresis and Zone Electrophoresis (XP-002447050), Electrophoresis, 2005, pp. 3032-3042.

Invitation to Pay Additional Fees (Form PCT/ISA/206) issued in PCT/EP2007/004468 on Nov. 27, 2007, 12 pages.

International Search Report & Written Opinion issued in International Patent Application No. PCT/EP2010/053713 dated Jul. 1, 2010.

International Search Report & Written Opinion issued in International Patent Application No. PCT/EP2010/053694 dated Nov. 11, 2010.

International Search Report & Written Opinion issued in International Patent Application No. PCT/EP2010/053703 dated Nov. 11, 2010.

International Search Report & Written Opinion issued in International Patent Application No. PCT/EP2010/053707 dated Jun. 14, 2010.

International Preliminary Report on Patentability issued in PCT/EP10/53694 on Oct. 4, 2011.

* cited by examiner

RADIO SYSTEM AND METHOD FOR RELAYING RADIO SIGNALS WITH A POWER CALIBRATION OF TRANSMIT RADIO SIGNALS

CROSS REFERENCE TO OTHER APPLICATIONS

The present application is related to "A Radio System And A Method For Relaying Radio Signals" Ser. No. 12/416,639 filed concurrently on Apr. 1, 2009 and to "A Radio System And A Method For Relaying Radio Signals" Ser. No. 12/416,596 filed concurrently on Apr. 1, 2009 and to "A Radio System And A Method For Relaying Packetized Radio Signals" Ser. No. 12/416,626 filed concurrently on Apr. 1, 2009. The entire disclosure of each of the foregoing applications is incorporated herein by reference.

FIELD OF THE INVENTION

The field of the present invention relates to a radio system for relaying radio signals with a power measurement and power calibration of transmit radio signals. The field of the present invention further relates to a method for relaying radio signals with a power measurement and a power calibration of transmit radio signals. Furthermore, the field of the present invention relates to a computer program product enabling a foundry to manufacture the radio system for relaying radio signals and a computer program product enabling a processor to carry out the method for relaying radio signals.

BACKGROUND OF THE INVENTION

Use of mobile communications networks has tremendously increased over the last decade. Operators of the mobile communications networks have increased the number of base stations in order to meet an increased demand for service by users of the mobile communications network. The base stations typically comprise radio systems for relaying radio signals, including software and hardware components. The radio signals are typically relayed into a cell of the mobile communications network. The operators of the mobile communications network wish to reduce the costs of the base stations. It is one option to implement the radio system as an antenna embedded radio system in order to reduce the costs of the base station. Implementing the radio system as an antenna embedded radio system may comprise implementing components of the radio system on a chip. Real estate needed to house the hardware components of the base station is reduced when implementing the radio station as an antenna embedded radio station. Power consumption during normal operation of the radio system is substantially reduced when implementing the radio system as the antenna embedded radio system comprising hardware components implemented on the chip.

It is of interest to provide a reliable quality of service to an individual user of the mobile communications network given the increase in the number of users. Several techniques have been suggested in order to deal with the increased number of users within the mobile communications network. One of the several techniques comprises beam forming capabilities in order to direct a beam relayed by the radio system in different directions to improve service coverage within the cells of the mobile communications network. The beam forming techniques rely on defined phase and amplitude relations between several ones of the antenna elements of the active antenna system. Calibration of transmit paths and receive paths is required to provide the defined phase and amplitude relationship between the beams. The calibration allows the estimation of a phase and amplitude deviation accumulated along the transmit path of the radio system. Likewise the calibration comprises estimating a phase and amplitude deviation accumulated along the receive paths of the radio system. In a second step the phase and amplitude deviation accumulated along the transmit paths can be corrected. An appropriate phase and amplitude change may be applied to the individual ones of the transmit paths to yield the defined phase and amplitude relationship between the individual ones of the transmit paths of the radio system in order to allow for beam forming techniques.

The beam forming techniques rely on accurate transmit power levels of the radio system. If the transmit power levels of the radio system are not set correctly, the beam forming will be deteriorated. Therefore it is of interest for the radio system to ascertain the transmit power levels within a range of, for example, ±0.5 dB. Likewise a relative ratio of the transmit power levels needs to be accurate. Typically the relative ratio of the transmit power levels needs to be substantially more accurate than the transmit power levels of individual ones of the transmit paths. In the prior art the accurate (relative ratio of) transmit power levels was achieved by design of the radio system. Such an approach relies on attenuating properties and/or gain changing properties of the different ones of the transmit paths to be substantially known. Likewise the attenuating properties and/or gain changing properties of the individual power detectors, one per transmit path, need to be known. With a power amplifier in at least one of the transmit paths failing, the beam forming capabilities are no longer provided by the radio system. Furthermore the prior art does not provide any means of monitoring the radio system to indicate whether or not all transmit paths are relaying according to prescribed transmit power levels other than the obvious provision of one power detector per transmitter.

In the prior art it is common to use a calibration signal generator in order to provide a calibration signal. The calibration signal is used to calibrate the phase and amplitude changes applied to the transmit paths in order to obtain the defined phase and amplitude relation between the transmit paths. Typically the calibration signal in the prior art is hidden within a payload signal that is to be relayed along the transmit paths. Alternatively a dedicated calibration signal may be used during idle times of the radio system. A disadvantage of the calibration signal being applied during idle times of the radio system is twofold. Firstly the calibration signal is visible to other radio systems and all the users within the cell of the mobile communications network. Therefore signal to noise ratio (SNR) would be deteriorated for the other radio systems and/or the users present within the cell. Hiding the calibration signal overcomes the disadvantage of unwanted calibration signals being relayed invisibly to the other radio systems and/or the users within the cell of the mobile communications network. Unfortunately the hidden calibration signal is of low SNR and therefore the calibration according to the prior art is difficult.

A scheme for a phase and amplitude calibration of the radio system not requiring a dedicated calibration signal is disclosed in a co-pending application of the applicant Ser. No.12/416,639 . It is to be understood that the present invention does not require a dedicated calibration signal; neither for the power calibration of the transmit radio signals nor for the calibration of the phase and amplitude changes.

European Patent EP 1120858 B1 to NTT discloses an adaptive array transceiver apparatus. In the NTT patent a local generator is used for generating the calibration signal.

The NTT patent does not provide a measurement of the RF transmit power levels of the adaptive array transceiver apparatus.

SUMMARY OF THE INVENTION

A radio system for relaying radio signals providing a power measurement of transmit radio signals according to the present invention comprises: at least one transmit path, a calibration unit, at least one link, a coupler, a power sensor and a feedback path. The at least one transmit path is adapted to relay a calibrated payload signal as a transmit signal. The calibration unit is adapted to split a payload signal into at least one calibrated payload signal. The calibration unit is further adapted to apply phase and amplitude changes to the calibrated payload signal. The at least one link is adapted to forward the calibrated payload signal to the at least one transmit path. The coupler is adapted to extract coupled transmit signals. The power sensor is adapted to monitor a transmit power level of a portion of a selected one of the coupled transmit signals. A power output of at least one of the transmit paths is measureable in response to the transmit power level of the portion of the selected one of the coupled transmit signals. The coupled transmit signals pertains to a selected one of the transmit paths.

The radio system further provides the power output, i.e. a transmit power level being updatable in response to the transmit power level of the portion of the selected one of the coupled transmit signals. It is to be understood that the updatable transmit power levels provide a power calibration of the transmit power levels of the transmit paths.

It is to be understood that the measuring of the power levels does not require a dedicated power calibration signal.

It is to be understood that the present invention may be implemented in a radio system relaying packetized radio signal and/or non-packetized radio signals. The power calibration disclosed herein is applicable to both types of radio systems. The phase and amplitude calibration and determining of transmit times are only explained with respect to a radio system relaying non-packetized radio signals. A co-pending patent application discloses a calibration scheme for a radio system relaying packetized radio signals Ser. No. 12/416,626.

It is to be understood that the radio system further provides an updating of phase and amplitude changes applied to at least one of the calibrated payload signals. The updating of phase and amplitude changes may comprise using a correlation, i.e. using correlating techniques, of the payload signal and a base band feedback signal. It will be appreciated that the correlation of payload signal and feedback signal require the payload signal and the feedback signal to be in a substantially identical frequency band. It is convenient to carry out the correlation at the base band of the radio system. Without any limitation the correlation may as well be carried out at an intermediate frequency. The intermediate frequency may be any frequency band between the base band of the radio system and a band of transmission of the radio system.

In the prior art it was necessary to adjust any attenuating and gain characteristics of the transmit paths very carefully by modifying the design of the radio system. The radio system as described herein enables a simple measurement of the transmit power levels. The attenuating and gain properties of the transmit paths can be monitored and adjusted if required during normal operation of the radio system. Therefore the manufacture of the transmit paths is simplified. The attenuating and gain properties of the transmit paths no longer need to be adjusted by design of the transmit paths. This reduces the costs of manufacture of the radio system. The present invention allows a periodical and/or permanent monitoring of the "health" of the radio system. The term "health" or "health state" of the radio system as used herein is to be construed as checking whether all transmit paths are transmitting within a predefined transmit power level accuracy.

According to a further aspect the present invention relates to a method for relaying radio signals providing a power measurement of transmit radio signals. The method comprises providing a payload signal and generating a calibrated payload signal. The providing of the calibrated payload signals comprises applying phase and amplitude changes to at least one of the calibrated payload signals. The generating of the calibrated payload signals comprise splitting the payload signal into one or more calibrated payload signals. The method comprises forwarding a transmit signal along at least one transmit path. According to the method a selected one of coupled transmit signals is fed back into a feedback path as a feedback signal. The method comprises a power measurement of the transmit paths in response to a portion of the selected one of coupled transmit signals.

It is to be understood that the power measurement may comprise a calibrating of transmit power levels in response to a transmit power level of the portion of the selected one of the coupled transmit signals.

There is no calibration signal generator needed for the generating of the calibrated payload signals.

The present invention further provides a computer program product for a manufacture of the radio system according to the invention.

In yet another aspect the present invention provides a computer program product for carrying out the method according to the invention.

DETAILED DESCRIPTION OF THE INVENTION

The present invention will now be described on the basis of the drawings. It will be understood that the embodiments and aspects of the invention described herein are only examples and do not limit the protective scope of the claims in any way. The invention is defined by the claims and their equivalents. It will also be understood that features of one aspect can be combined with a feature of a different aspect.

Figure 1A:
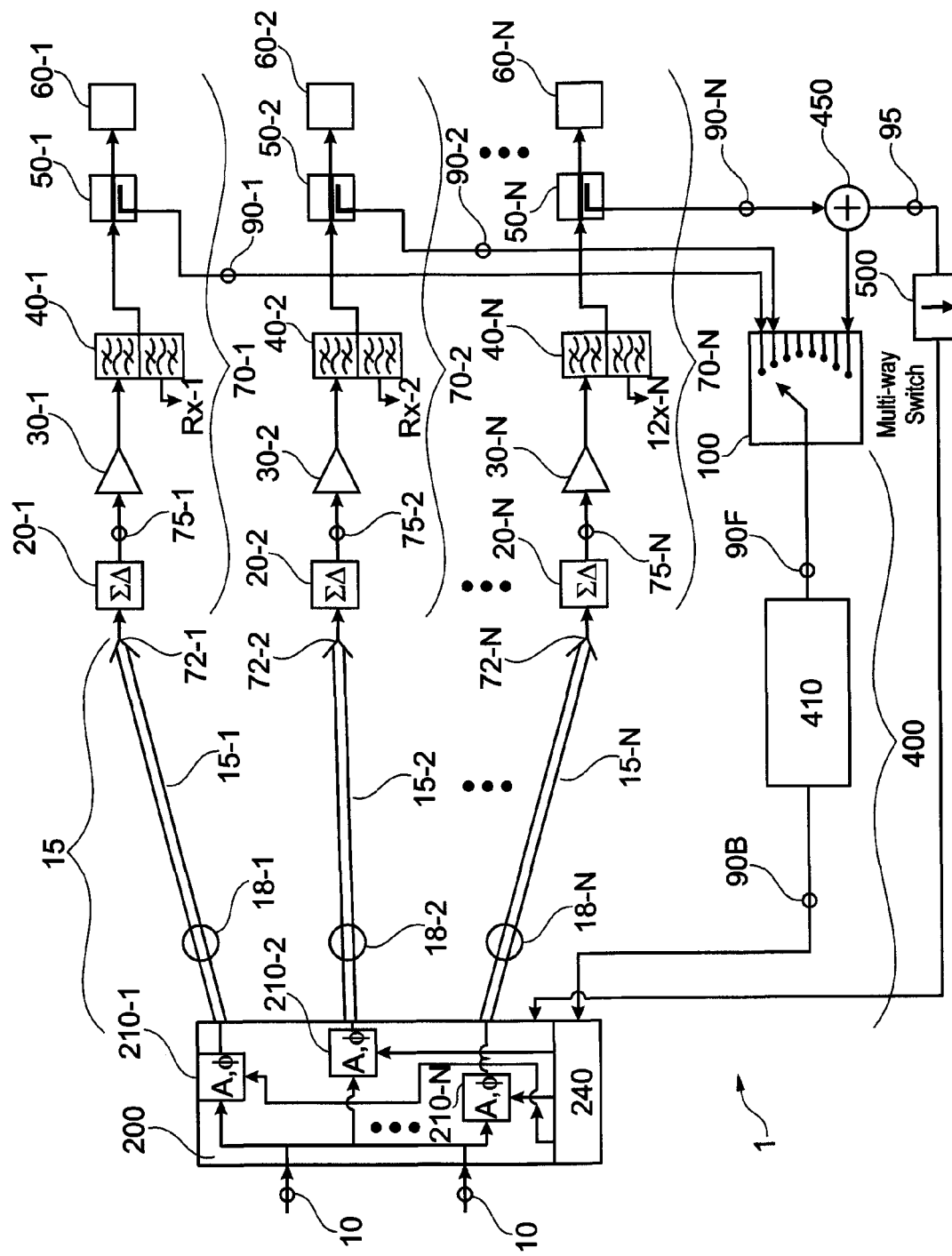
FIG. 1a shows a radio system.

FIG. 1a shows a radio system 1. A payload signal 10 is forwarded to the radio system 1. Typically the payload signal 10 is provided in a format comprising an in phase component I and a quadrature component Q. The payload signal 10 is forwarded to a digital radio interface (DRI, see FIGS. 1b, 1c), as is known in the art. The digital radio interface may be implemented in one non-limiting aspect of the invention according to the open base station architecture initiative standard (OBSAI). A calibration unit 200 is adapted to split the payload signal 10 into at least one calibrated payload signal 18-1, 18-2, . . . , 18-N. The calibration unit 200 is further adapted to apply phase and amplitude changes 210-1, 210-2, . . . , 210-N to the calibrated payload signal 18-1, 18-2, . . . , 18-N. The calibrated payload signal is forwarded along at least one link 15-1, 15-2, . . . , 15-N. The links 15-1, 15-2, . . . , 15-N are adapted to forward the calibrated payload signals 18-1, 18-2, . . . , 18-N to the transmit paths 70-1, 70-2, . . . , 70-N. The transmit paths 70-1, 70-2, . . . , 70-N comprise an entry port 72-1, 72-2, . . . , 72-N. The transmit paths 70-1, 70-2, . . . , 70-N receive the calibrated payload signals 18-1, 18-2, . . . , 18-N at the entry ports 72-1, 72-2, . . . , 72-N. Within FIG. 1*a* there are only three of the transmit paths 70-1, 70-2, . . . , 70-N shown. Obviously any other number of transmit paths 70-1, 70-2, . . . , 70-N is conceivable. The links 15-1, 15-2, . . . , 15-N may be flexible, and of different length. The links are, as a non-limiting example, implemented as fibre links. The links 15-1, 15-2, . . . , 15-N, may apply individual ones of link phase and amplitude deviations to the calibrated payload signals 18-1, 18-2, . . . , 18-N. The calibrated payload signal 18-1, 18-2, . . . , 18-N is in a digital domain. It is convenient to provide the calibrated payload signal 18-1, 18-2, . . . , 18-N and the payload signal 10 in the base band of the radio system 1. It is to be noted that the payload signal 10 and the calibrated payload signal 18-1, 18-2, . . . , 18-N may be without any limitation be provided at an intermediate frequency band IF. The intermediate frequency band IF may be any frequency band between the base band frequency of the radio system 1 and a frequency of transmission of the radio system 1. In other words the phase and amplitude changes 210-1, 210-2, . . . , 210-N may be applied to the payload signal 10 at the intermediate frequency instead of the base band. The links 15-1, 15-2, . . . , 15-N provide spatial flexibility with respect to how the transmit paths 70-1, 70-2, . . . , 70-N are arranged. The arrangement of the transmit paths 70-1, 70-2 . . . , 70-N will be mostly governed by a spatial arrangement of antenna elements 60-1, 60-2, . . . , 60-N terminating the transmit paths 70-1, 70-2, . . . , 70-N, The links 15-1, 15-2, . . . , 15-N will cause a variation in link time needed for the calibrated payload signal 18-1, 18-2, . . . , 18-N to travel from the calibration unit 200 to the entry reports 72-1, 72-2, . . . , 72-N of the transmit paths 70-1, 70-2, . . . , 70-N.

As is known in the art antenna elements 60-1, 60-2, . . . , 60-N forming an (active) antenna array are sensitive to delay times for the transmit signals 75-1, 75-2 . . . , 75-N travelling along the transmit paths 70-1, 70-2, . . . , 70-N. Any change in the transmit delay times will correspond to a transmit deviation 90T accumulated along the transmit paths 70-1, 70-2, . . . , 70-N. The transmit deviations 90T need to be corrected in order to reach the defined phase and amplitude relation that is needed using the beam forming techniques. The transmit times need to be corrected for a proper relaying by radio system with respect to communication protocols. In other words the radio system needs to know how long a payload signal 10 takes from entering the DRI until leaving the radio system 1 at one of the antenna arrays 60-1, 60-2, . . . , 60-N.

It is to be understood that providing the links 15-1, 15-2, . . . , 15-N enables the active antenna array formed by the antenna element 60-1, 60-2, . . . , 60-N to be implemented as a distributed active antenna array. In other words the calibration unit 200 may be placed apart from the transmit paths 70-1, 70-2, . . . , 70-N.

The antenna elements 60-1, 60-2, . . . , 60-N may be transmit-only antenna elements. Alternatively or additionally, the antenna elements 60-1, 60-2, . . . , 60-N may be transmit and receive antenna elements. Only the transmit paths 70-1, 70-2, . . . , 70-N are shown in FIG. 1. The radio system 1 may be combined with a receive system known in the art. The receive system is not shown in detail but will comprise receive paths Rx-1, Rx-2, . . . , Rx-N. The calibrated payload signal 18-1, 18-2, . . . , 18-N reaching the entry port 72-1, 72-2, . . . , 72-N of the transmit paths 70-1, 70-2, . . . , 70-N is forwarded along the transmit paths 70-1, 70-2, . . . , 70-N as transmit signal 75-1, 75-2, . . . , 75-N.

The transmit signals 75-1, 75-2, . . . , 75-N are digital to analogue converted using a digital to analogue converter 20-1, 20-2, . . . , 20-N along the transmit paths 70-1, 70-2, . . . , 70-N. The digital to analogue converter 20-1, 20-2, . . . , 20-N may comprise a sigma delta digital to analogue converter, as shown in FIG. 1*a*. The sigma delta digital to analogue converters 20-1, 20-2, . . . , 20-N do not require an up-converter for up-converting and filtering the transmit signal 75-1, 75-2, . . . , 75-N. An amplifier 30-1, 30-2, . . . , 30-N is provided for amplifying the transmit signal 75-1, 75-2, . . . , 75-N. A filter 40-1, 40-2, . . . , 40-N is provided for separating the transmit paths 70-1, 70-2, . . . , 70-N from the receive paths Rx-1, Rx-2, . . . , Rx-N. The filter 40-1, 40-2, . . . , 40-N may be implemented as a duplex filter as shown in FIG. 1*a*. The filters 40-1, 40-2, . . . , 40-N are adapted to eliminate any signal components that are out of a frequency band of transmission of the radio system 1.

In order to allow for a power calibration of the radio system 1, a portion of the transmit signals 75-1, 75-2, . . . , 75-N is fed back to the calibration unit 200. The radio system 1 provides a coupler 50-1, 50-2, . . . , 50-N to extract the portion of the transmit signal 75-1, 75-2. . . , 75-N as a coupled transmit signal 90-1, 90-2, . . . , 90-N. The feedback of the coupled transmit signals 90-1, 90-2, . . . , 90-N allows the determination of the phase and amplitude deviations accumulated between individual ones of the transmit signals 75-1, 75-2, . . . , 75-N travelling along the links 15-1, 15-2, . . . , 15-N and the transmit paths 70-1, 70-2, . . . , 70-N. Likewise the feedback of the coupled transmit signals 90-1, 90-2, . . . , 90-N allows the determination of the transmit times for the links 15-1, 15-2, . . . , 15-N and the transmit paths 70-1, 70-2, . . . , 70-N.

A calibration update unit 240 uses the feedback path 400, more precisely signals relayed along the feedback path 400, in order to update the phase and amplitude changes 210-1, 210-2, . . . , 210-N applied to the calibrated payload signal 18-1, 18-2, . . . , 18-N.

A switch 100 is adapted to forward a selected one of the coupled transmit signals 90-1, 90-2, . . . , 90-N as a feedback signal 90F into the feedback path 400. The feedback path 400 comprises a feedback signal demodulator 410. The feedback signal demodulator 410 is adapted to receive the feedback signal 90F from the switch 100. It is to be understood that the feedback signal 90F comprises an analogue radio frequency (RF) signal within the frequency range of transmission of the transmit paths 70-1, 70-2, . . . , 70-N. It is conceivable that the couplers 50-1, 50-2, . . . , 50-N couple not only to their respective antenna element 60-1, 60-2, . . . , 60-N but additionally to a next neighbouring antenna element. Furthermore the couplers 50-1, 50-2, . . . , 50-N may couple to RF signals received by the antenna elements 60-1, 60-2, . . . , 60-N. Neither the RF signals received by the antenna element 60-1, 60-2, . . . , 60-N nor the RF signals from next neighbouring antenna elements are of relevance for a calibration of the transmit paths 70-1, 70-2, . . . , 70-N. It may be of interest to provide filtering elements (not shown) downstream of the couplers 50-1, 50-2, . . . , 50-N. The filter elements (not shown) may be arranged between the couplers 50-1, 50-2, ..., 50-N and the switch 100. Alternatively and without any limitation the filtering elements (not shown) may also be provided downstream of the switch 100. An individual filtering element downstream of the switch 100 may need to incorporate all the filtering characteristics of the filtering elements disposed between the couplers 50-1, 50-2, ..., 50-N and the switch 100, when implementing the individual filtering element downstream the switch 100.

As a further alternative any filtering capabilities needed may be incorporated within the feedback signal demodulator 410. The feedback signal demodulator 410 receives the feedback signal 90F from the switch 100. The feedback signal demodulator 410 may be adapted to attenuate the feedback signal 90F if necessary. The feedback signal demodulator 410 is adapted to analogue to digital convert the feedback signal 90F. The feedback signal demodulator 410 may comprise a sigma delta converter for the analogue to digital converting. The feedback signal demodulator 410 may without any limitation comprise conventional analogue to digital converters. A down converter functionality (not shown) is also needed, when using conventional analogue to digital converters for the analogue to digital converting. As mentioned before, the feedback signal demodulator 410 may further comprise a filtering functionality. The feedback signal demodulator 410 generates a base band feedback signal 90B. It is to be understood that the base band feedback signal 90B comprises a digital signal. The base band feedback signal 90B is forwarded to the calibration update module 240.

In FIG. 1a a splitter 450 is provided in order to extract a selected one of the coupled transmit signals 90-1, 90-2, ... 90-N. The selected one of the coupled transmit signals 90-1, 90-2, ..., 90-N is the coupled transmit signal 90-N in FIG. 1a. Without any limitation any other one of the coupled transmit signals 90-1, 90-2, ... 90-N may be the selected one of the coupled transmit signals 90-1, 90-2, ... 90-N. The splitter 450 is adapted to extract a portion 95 out of the selected one of the coupled transmit signals 90-1, 90-2, ... 90-N. The portion 95 of the selected one of the coupled transmit signals 90-1, 90-2, ... 90-N is forwarded to a power sensor 500. Without any limitation the splitter 450 may comprise attenuating capability so that the portion 95 of the selected one of the coupled transmit signals 90-1, 90-2, ... 90-N is attenuated when leaving the splitter 450.

For the power measurement and calibrating as described further below the calibration unit 200 and/or the calibration update unit 240 would need to know any attenuating properties of the splitter 450. The power detector 500 may be implemented as a diode or any other suitable RF detector. The power detector 500 allows the measurement of a transmit power level relayed by the transmit paths 70-1, 70-2, ... 70-N pertaining to the selected coupled transmit signal 90-1, 90-2, ... 90-N.

It is to be understood that the power detector 500 also allows the monitoring and measuring of the transmit power levels of the transmit paths 70-1, 70-2, ... 70-N not pertaining to the selected coupled transmit signal 90-1, 90-2, ... ,90-N. More precisely the power detector 500 allows a measuring of a relative transmit power level ratio between the transmit paths 70-1, 70-2, ... 70-N.

When measuring the relative transmit power level ratio of the transmit paths 70-1, 70-2, ... 70-N the calibration unit 200 and/or the calibration update module 240 may use a transmit power level deduced from either the feedback signal 90F reaching the feedback signal demodulator 410 and/or a transmit power level deduced from the base band feedback signal 90B. Gain and attenuating properties of the transmit paths 70-1, ..., 70-N, the couplers 50-1, 50-2, ... ,50-N, the switch 100, the splitter 450, and the feedback signal demodulator 410 need to be known for determining transmit power levels based on the feedback signal 90F and/or the base band feedback signal 90B.

It is convenient to use the transmit signals 75-1, 75-2, ..., 75-N for the power measurement and the power calibrating. Without any limitation dedicated power calibration signals may be used as well for the power calibrating. It will be appreciated by a person skilled in the art that any gain and/or attenuating characteristics of the splitter 450 and/or the power sensor 500 are not present for the coupled transmit signals 90-1, 90-2, ..., 90-N travelling directly from the couplers 50-1, 50-2, ... ,50-N to the switch 100. It is the provision of the power sensor 500 that allows a direct measurement of the portion 95 of the selected one of the coupled transmit signals 90-1, 90-2, ..., 90-N. The direct measurement of the transmit power can then be used to "calibrate" the power levels deduced at the feedback demodulator 410 and/or the calibration unit 200.

The transmit power level ratios determined using either the feedback signal demodulator 410 and/or the calibration unit 200 can be "calibrated" from the direct measurement using the power sensor 500.

It will be appreciated by a person skilled in the art that the feedback signal demodulator 410 and/or the calibration unit 200 is adapted to change power ratings and/or gain values of the amplifiers 30-1, 30-2, ... ,30-N within the transmit paths 70-1, 70-2, ... ,70-N. The control lines for setting the gain values of the amplifiers 30-1, 30-2, ... ,30-N are not shown in the drawings in order to improve a clarity of the drawings.

Figure 1B:
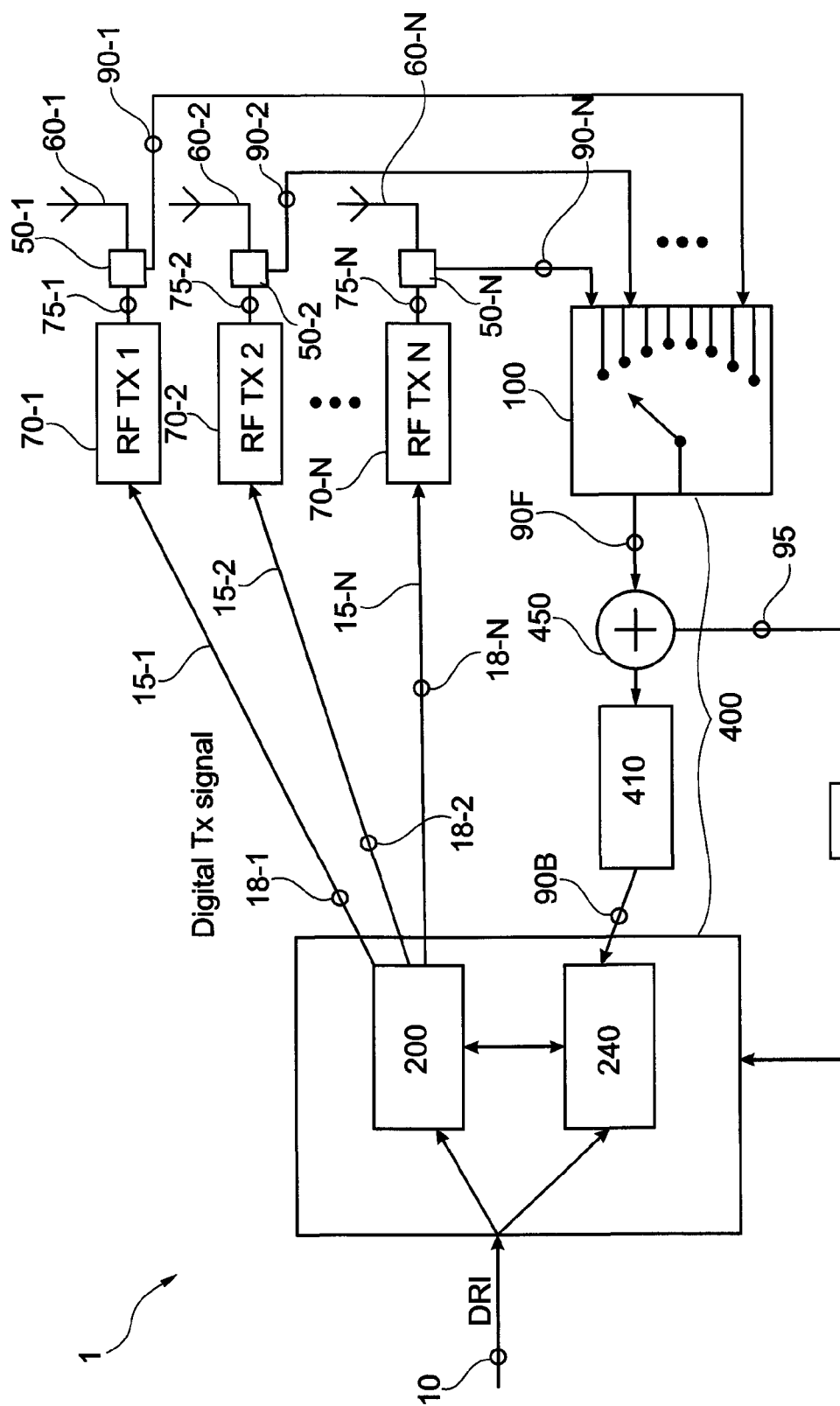
FIG. 1b shows a further aspect of the radio system.

FIG. 1b shows a further aspect of the radio system 1. It is to be understood that within FIG. 1B the transmit paths 70-1, 70-2, ... ,70-N are shown as individual items. The transmit paths 70-1, 70-2, ... ,70-N as shown in FIG. 1b correspond to those discussed with respect to FIG. 1a. Within FIG. 1b the splitter 450 was moved from a position upstream of the switch 100 to a position downstream of the switch 100. Therefore the splitter 450 extracts a portion 95 of the feedback signal 90F as implemented in FIG. 1b. The feedback signal 90F is an analogue signal and therefore the same analogue splitter 450 may be used as in FIG. 1a. Providing the splitter 450 downstream of the switch 100 will allow the measurement of the portion 95 of the selected one of the coupled transmit signals 90-1, 90-2, ..., 90-N for each one of the coupled transmit signals 90-1, 90-2, ..., 90-N. As before all of the attenuating characteristics of the couplers 50-1, 50-2, ..., 50-N and the switch 100 need to be known. More precisely one would need to know any attenuating properties of the switch 100. For the switch 100 it may well be that attenuating properties vary between individual ones of the settings of the switch 100. As stated before using a signal of known transmit power level would allow the measurement of the different attenuations for the individual switch settings of the switch 100. Such a signal could, for example, be provided during the manufacture of the unit, specifically to allow this calibration to take place. With the arrangement of the splitter 450 as shown in FIG. 1b the measurement of the relative transmit power levels of the transmit paths 70-1, 70-2, ..., 70-N may be simplified compared to the setup of FIG. 1a.

Figure 1C:
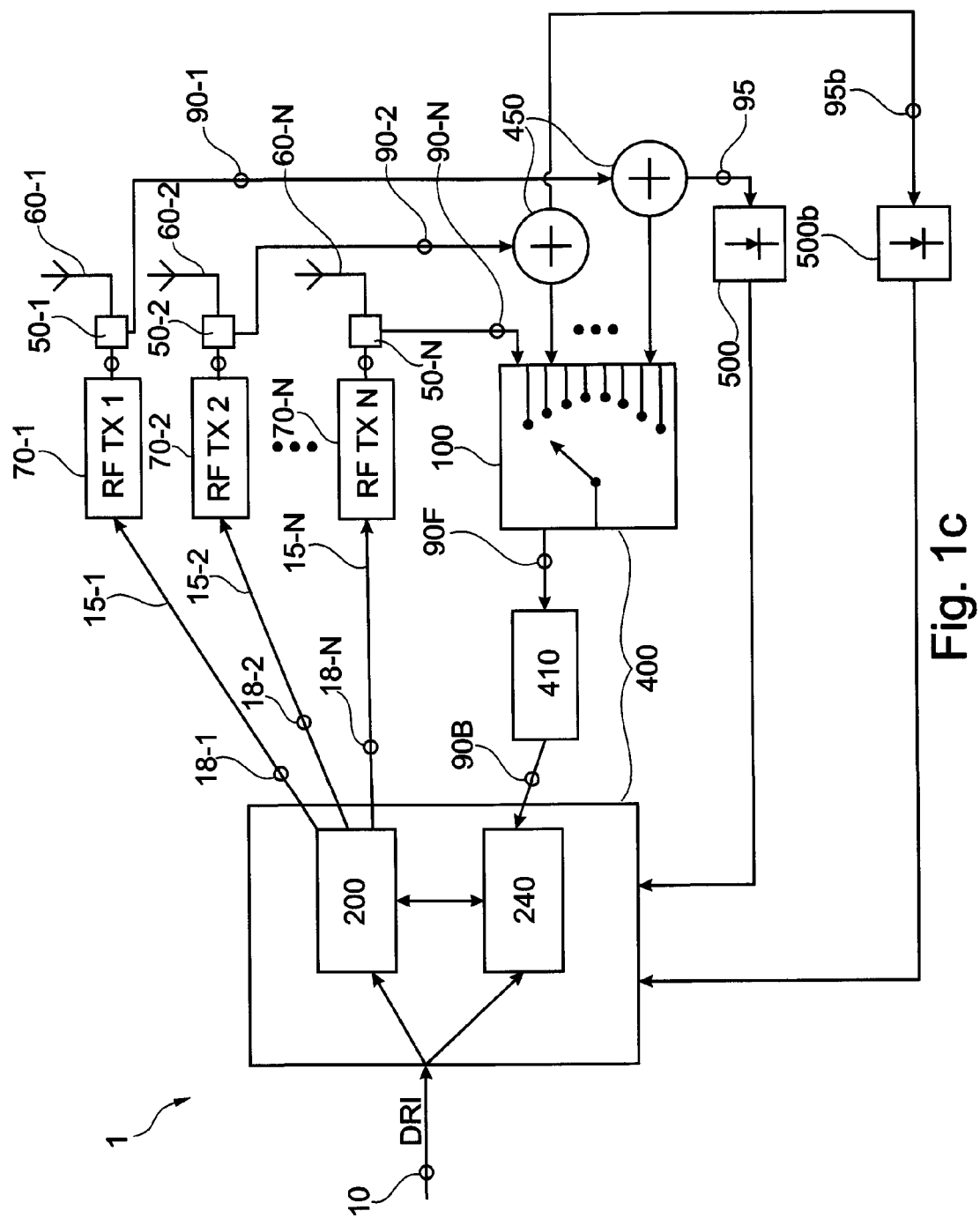
FIG. 1c shows yet another aspect of the radio system.

FIG. 1c shows yet another aspect of the radio system 1. It may be of interest to provide a second splitter 450 in order to extract a second portion 95b of a second selected one of the coupled transmit signals 90-1, 90-2, ..., 90-N. The second portion 95b of the coupled transmit signals 90-1, 90-2, ..., 90-N is forwarded to a second power sensor 500b. Providing the power sensor 500 and the second power sensor 500b allows monitoring a state of health of the radio system 1. In particular the providing of the second power sensor 500b will introduce a redundancy into the power calibrating provided with the radio system 1.

It will be appreciated by a person skilled in the art that two power sensors 500, 500b may also be arranged such that the first power sensor 500 is arranged upstream of the switch 100 and the second power sensor 500b is arranged downstream of the switch 100 (as shown in FIGS. 1a-1c). Such an arrangement would allow for directly measuring attenuating properties of the switch 100 in one of the switching positions of the switch 100.

It will be appreciated by a person skilled in the art that the switch 100 may be replaced by a combiner (not shown). The use of the combiner may entail incorporating switches and/or attenuators (not shown) in order to suppress at least one selected one of the coupled transmit signals 90-1, 90-2, . . . , 90-N. Again any attenuating characteristics of the switches and/or attenuators would need to be known for both absolute power calibration and the calibration of relative transmit power ratios. Furthermore, one or more of the transmit path signals 75-1, 75-2, . . . , 75-N could be disabled in the calibration unit 200 as an alternative to utilizing hardware switches in either the forward transmit path(s) 70-1, 70-2, . . . , 70-N or the feedback path 400.

A position of the switch 100 is controlled by the calibration unit 200 and/or the feedback signal demodulator 410. In other words the calibration unit 200 knows which one of the coupled transmit signals 90-1, 90-2, . . . , 90-N is to be forwarded to the feedback signal demodulator 410 as the feedback signal 90F in the feedback path 400.

Figure 2:
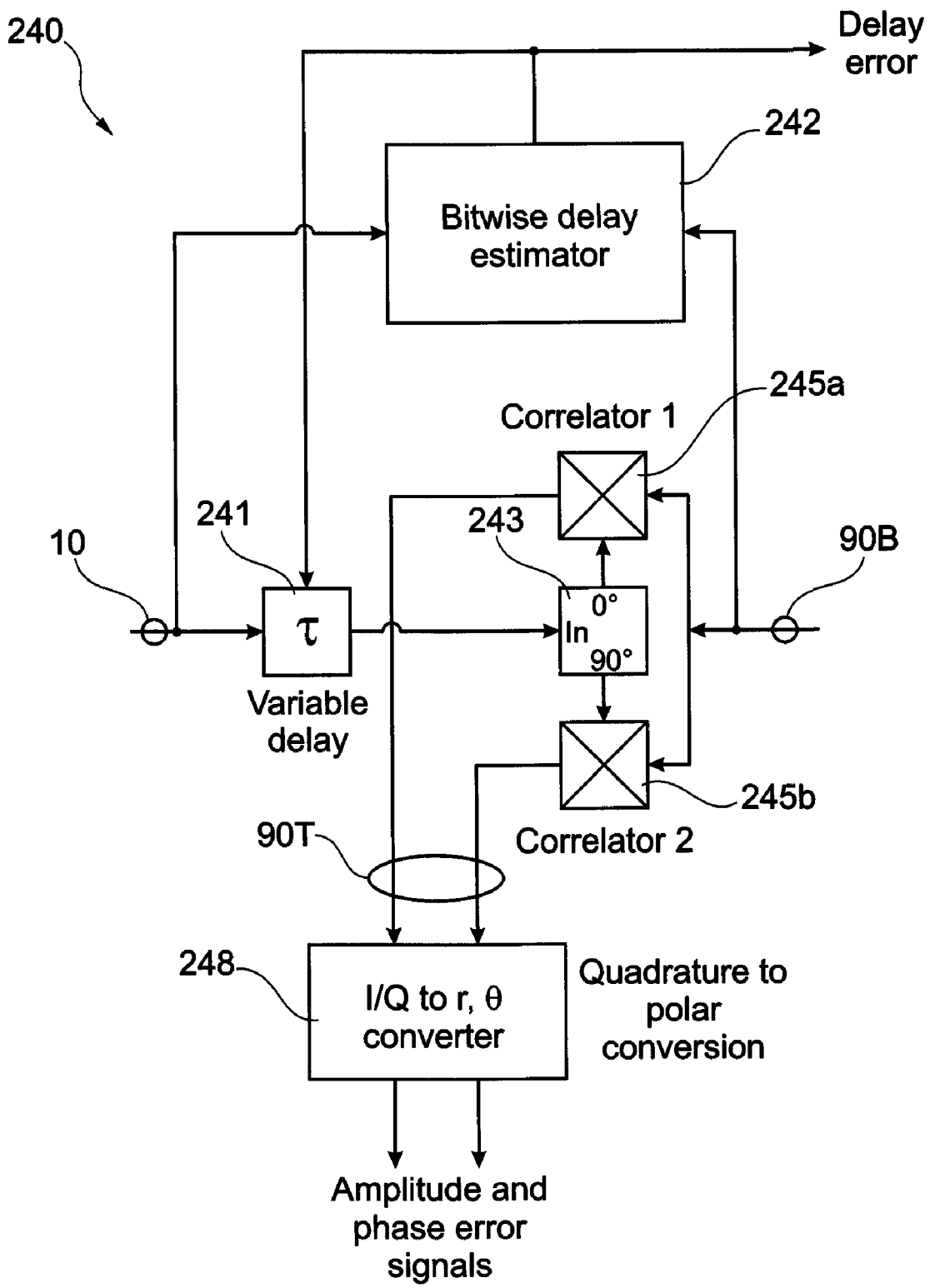
FIG. 2 shows a calibration update module.

FIG. 2 shows the calibration update unit 240 in more detail. The payload signal 10 is provided to the calibration update unit 240 and a variable delay 241 is added to the payload signal 10. The variable delay 241 may, for example, compensate the time required for the calibrated payload signal 18-1, 18-2, . . . ,18-N to travel along the link 15-1, 15-2, . . . , 15-N, the transmit path 70-1, 70-2, . . . , 70-N and the feedback path 400 reaching the feedback signal demodulator 410 and further the calibration update unit 240 as the base band calibration signal 90B.

The (delayed) payload signal 10 is forwarded to a splitter 243 splitting the (delayed) payload signal 10 into the in-phase component I and the quadrature component Q. The in-phase component I of the (delayed) payload signal 10 is forwarded to a first correlator 245a. The quadrature component Q of the (delayed) payload signal 10 is forwarded to a second correlator 245b. The first correlator 245a and the second 245b are adapted to deduce the transmit deviations 90T between the base band feedback signal 90B and the (delayed) payload signal 10. More precisely, the first correlator 245a and the second correlator 245b correlate the in-phase component I and the quadrature component Q of the (delayed) payload signal 10 with the base band feedback signal 90B.

The calibration update unit 240 further comprises a delay estimator 242. The delay estimator 242 is adapted to estimate a delay between the payload signal 10 and the base band calibration signal 90B. The delay estimator 242 is used in order to give a first estimate of the variable time delay 241 that needs to be added to the payload signal 10 before correlating the in phase component I and the quadrature component Q of the (delayed) payload signal 10 with the base band calibration signal 90B.

The delay estimator 242 may further be adapted to provide the transmit time. The transmit time comprises the time from the payload signal 10 entering the digital radio interface DRI until a corresponding transmit signal 75-1, 75-2, . . . , 75-N is being relayed by the antenna elements 60-1, 60-2, . . . , 60-N of the radio system 1.

The calibration update unit 240 further comprises a converter module 248. The converter module 248 converts the transmit deviation 90T provided in an in phase I and quadrature component Q format into the transmit deviations 90T in a polar format comprising a phase deviation and an amplitude deviation. The transmit deviations 90T represented in the polar format provide the phase and the amplitude deviation that is accumulated along the links 15-1, 15-2, . . . , 15-N, the transmit paths 70-1, 70-2, . . . , 70-N and the feedback path 400 of the radio system 1. It will be appreciated by a person skilled in the art that phase and amplitude deviations accumulated between the switch 100 and the calibration update module 240 are substantially identical for all the coupled transmit signals 90-1, 90-2, . . . , 90-N. It is implicitly assumed that the phase and amplitude deviations accumulated between the couplers 50-1, 50-2, . . . , 50-N and the switch 100 are substantially identical for all the transmit paths 70-1, 70-2, . . . ,70-N with the design as shown in FIGS. 1a-1c.

The radio system 1 does not rely on a dedicated calibration signal for calibrating phase and amplitude changes 210-1, 210-2, . . . ,210-N applied to the transmit paths 70-1, 70-2, . . . ,70-N as used in the prior art systems. Hence there is no dedicated calibration signal generator required, reducing the hardware costs of the radio system 1. For the power calibration there is no need for a dedicated power calibrating signal. In fact the transmit power level ratio may be measured and monitored accurately without the dedicated power calibrating signal.

Typically the radio system 1 is connected to at least two antenna elements 60-1, 60-2, . . . , 60-N such that a defined phase and amplitude relation between individual ones of the transmit paths 70-1, 70-2, . . . , 70-N, can be provided. The defined phase and amplitude relation between the individual ones of the transmit paths 70-1, 70-2, . . . , 70-N is required for techniques such as beam forming, beam tilting, a direction of arrival (DoA) detection, as is known in the art. The radio system 1 is adapted to carry out these techniques. The transmit deviations 90T determined by the calibration update module 240 serve as a basis to apply phase and amplitude changes 210-1, 210-2, . . . , 210-N to yield the defined phase and amplitude relation between the individual ones of the transmit paths 70-1, 70-2, . . . , 70-N. The phase and amplitude changes 210-1, . . . , 210-N are applied to the calibrated payload signals 18-1, 18-2, . . . , 18-N yielding the defined phase and amplitude relation between the antenna elements 60-1,60-2, . . . , 60-N.

Figure 3A:
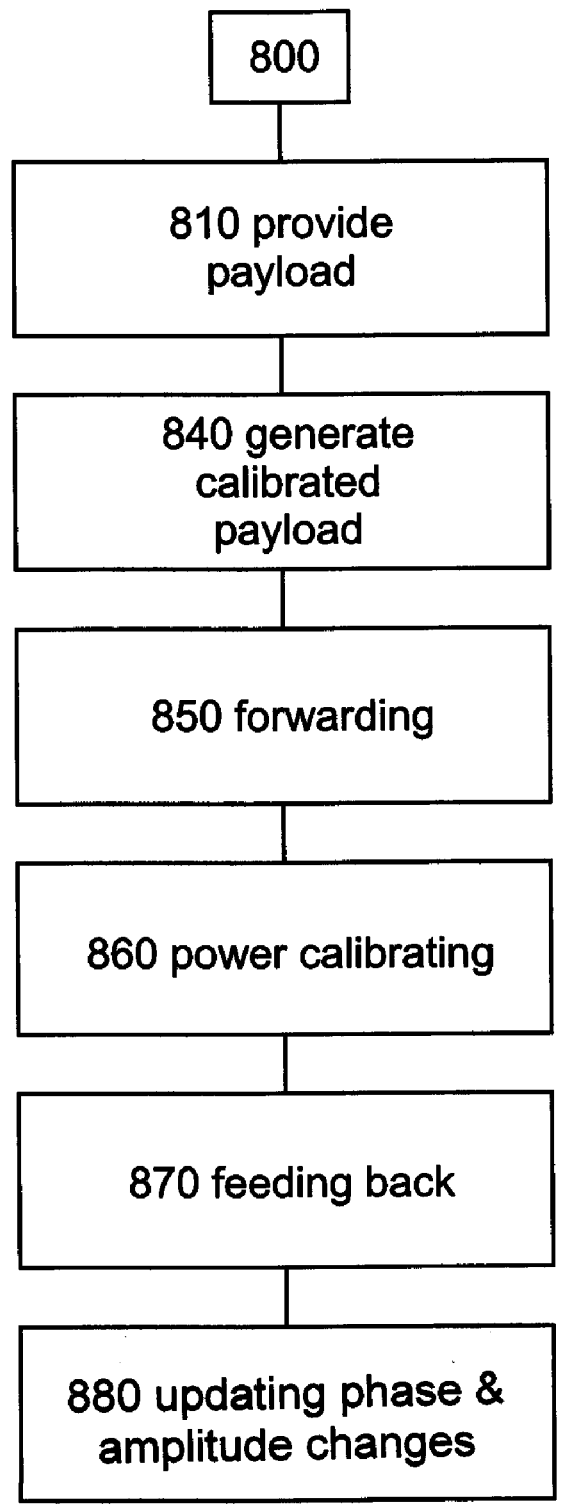
FIG. 3a shows a flow chart of the method for relaying radio signals.

The present system further provides a method 800 for relaying radio signals providing a power calibration of transmit radio signals. FIG. 3a shows a flow chart of the method 800.

In a step 810 the payload signal 10 is provided. The payload signal 10 may be provided comprising the in-phase component I and the quadrature component Q in pairs (I, Q), as is known in the art. The payload signal 10 may be provided at a digital radio interface DRI as explained above.

In a step 840 the calibrated payload signal 18-1, 18-2, . . . , 18-N is generated. The calibrated payload signal 18-1, 18-2, . . . , 18-N is generated by applying the phase and amplitude changes 210-1, 210-2, . . . , 210-N to the payload signal 10. In a step 850 the transmit signal 75-1, 75-2, . . . , 75-N is forwarded along the transmit path 70-1, 70-2, . . . , 70-N.

A step 860 comprises a power measuring of the radio system 1. A step 870 provides a feeding back of a selected one of the coupled transmit signals 90-1, 90-2, . . . , 90-N as the feedback signal 90F into the feedback paths 400. The step 880 comprises an updating of phase and amplitude changes 210-1, 210-2, . . . , 210-N. The updating 880 may be implemented in response to the feedback signal 90F in the feedback paths 400.

Figure 3B:
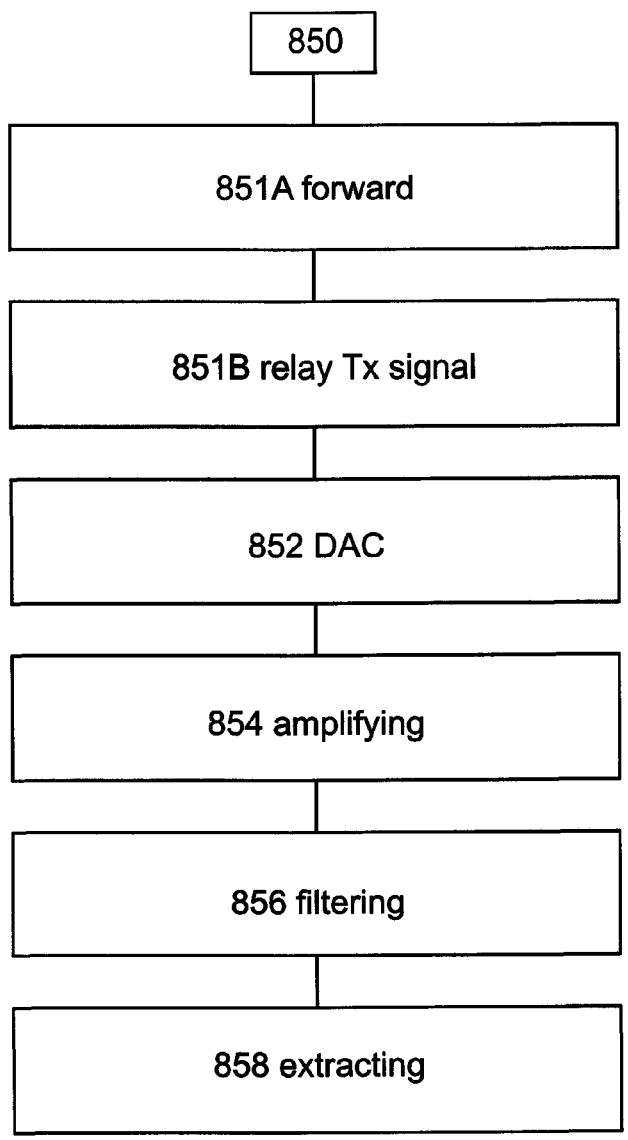
FIG. 3b shows a flow chart illustrating a step of forwarding a calibrated payload signal.

FIG. 3b shows further details of the step 850 of forwarding the payload signal 10. A step 851A comprises forwarding a calibrated payload signal 18-1, 18-2, . . . , 18-N along the links 15-1,15-2, . . . ,15-N. The calibrated payload signal 18-1,18-2, . . . ,18-N was generated in the step 851A by applying the phase and amplitude changes 210-1, 210-2, . . . ,210-N to the payload signal 10 after the payload signal 10 was split. In the step 851A the calibrated payload signals 18-1, 18-2, . . . , 18-N are forwarded to the entry ports 72-1, 72-2, . . . , 72-N of the transmit paths 70-1, 70-2, . . . , 70-N. In a step 851B the calibrated payload signals 18-1, 18-2, . . . , 18-N are relayed as a transmit signal 75-1, 75-2, . . . , 75-N along the transmit paths 70-1, 70-2, . . . , 70-N after reaching the entry ports 72-1, 72-2, . . . , 72-N.

The step 850 comprises a step 852 of digital to analogue converting the transmit signal 75-1, 75-2, . . . , 75-N. The step of digital to analogue converting may comprise using the sigma delta digital to analogue convertors 20-1, 20-2, . . . , 20-N. It will be appreciated that the use of the sigma delta digital to analogue convertors does not require an up-converting step and a filtering step as is required with traditional digital to analogue converters.

In a step 854 the transmit signal 75-1, 75-2, . . . , 75-N is amplified. The amplifying step 854 may be carried out using the amplifier 30-1, 30-2, . . . , 30-N. The step 850 comprises a step of filtering 856 the transmit signal 75-1, 75-2, . . . , 75-N. The step of filtering 856 may as well comprise using duplex filters 40-1, 40-2, . . . , 40-N. The use of the duplex filters 40-1, 40-2, . . . , 40-N is of interest when dealing with the radio system 1 comprising transmit and receive functionalities. A step 858 comprises extracting a coupled transmit signal 90-1, 90-2, . . . , 90-N from the transmit signals 75-1, 75-2, . . . , 75-N.

Figure 3D:
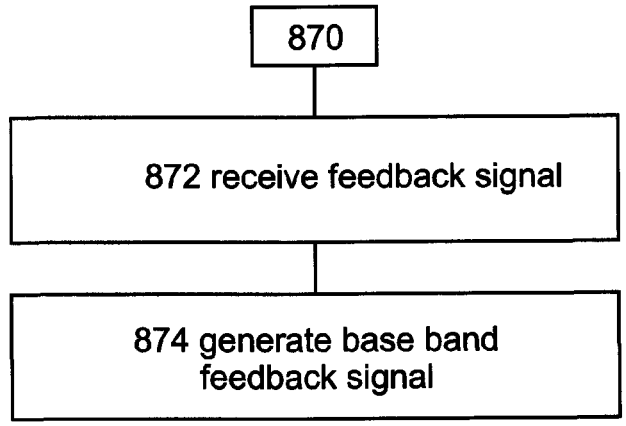
FIG. 3d shows a flow chart illustrating a step of feeding back a selected one of coupled transmit signals.
Figure 3C:
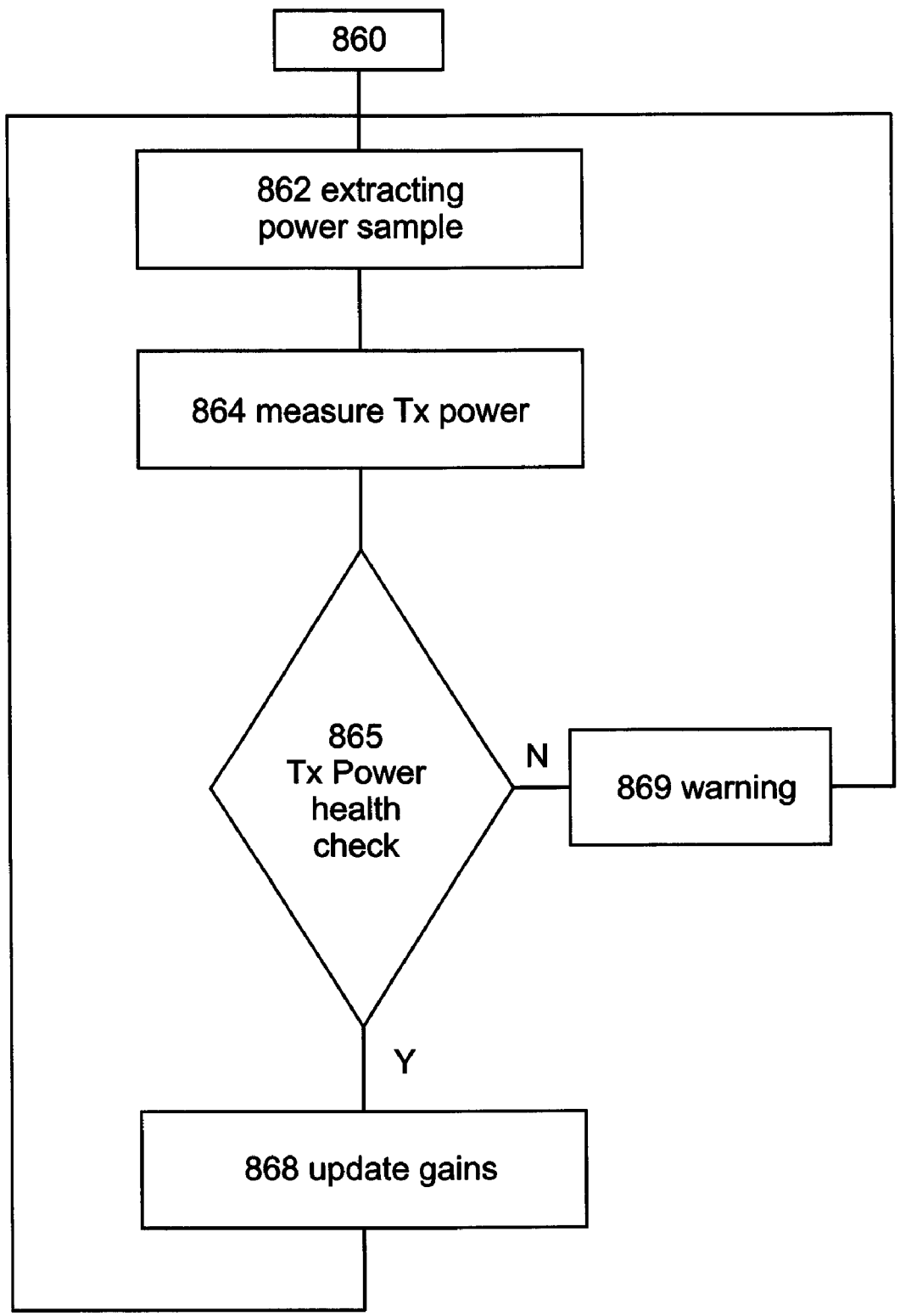
FIG. 3c shows a flow chart illustrating a step of power calibrating.

FIG. 3c shows details of the step of power measuring 860. The step of power measuring 860 comprises a step 862 of extracting the portion 95 of the selected coupled transmit signal 90-1, 90-2, . . . , 90-N. The step 862 may be implemented using the splitter 450 and/or the second splitter 450b. The step 860 of power measuring further comprises a step 864 of measuring a transmit power level. The transmit power level may be measured in the step 864 using the power sensor 500 or the second power sensor 500b as described with respect to FIGS. 1a to 1c. A step 865 comprises a "health check" of the transmit power. In response to the measured transmit power in the step 864 it is determined whether the measured transmit power indicates a healthy state of operation of the radio system 1. The radio system 1 may know power levels needed in order to correctly achieve the beam forming techniques as described above. In case the health check in the step 865 of the transmit power levels does not reflect a healthy state of operation a warning may be issued in a step 869. It is to be understood that the step 865 of the health check of the transmit power does not only cover the transmit power levels measured using the power sensor 500 and the second power sensor 500b. Furthermore the health check in the step 865 comprises checking the relative transmit power levels as explained above. In the case that the health check of the step 865 is positive a step 868 of updating gain values of the transmit paths 70-1, 70-2, . . . , 70-N is carried out in response to the checking in the step 865. After the step 868 the method returns to the step 862. Likewise the method returns to the step 862 after the step 869.

It is to be understood that with the step 868 of updating the gain values of the transmit paths 70-1, 70-2, . . . , 70-N a power calibrating of the transmit power levels is achievable. The calibrating of the relative transmit power levels is also achievable in the step 868a of updating the gain values of the transmit paths 70-1, 70-2, . . . , 70-N.

FIG. 3d shows further details of the step 870 of feeding back the selected one of the coupled transmit signals 90-1, 90-2, . . . , 90-N as the feedback signal 90F. The step 870 comprises a step 872 of receiving the feedback signal 90F at the feedback signal demodulator 410. The step 870 further comprises a step 874 of generating a base band feedback signal 90B. The step 874 of generating of the base band feedback signal 90B is typically implemented by an analogue to digital converting of the feedback signal 90F. As is known in the art, the analogue to digital converting of the feedback signal 90F typically comprises a filtering of the feedback signal 90F and/or the base band feedback signal 90B. If necessary the feedback signal 90F is attenuated in the step 874.

Figure 3E:
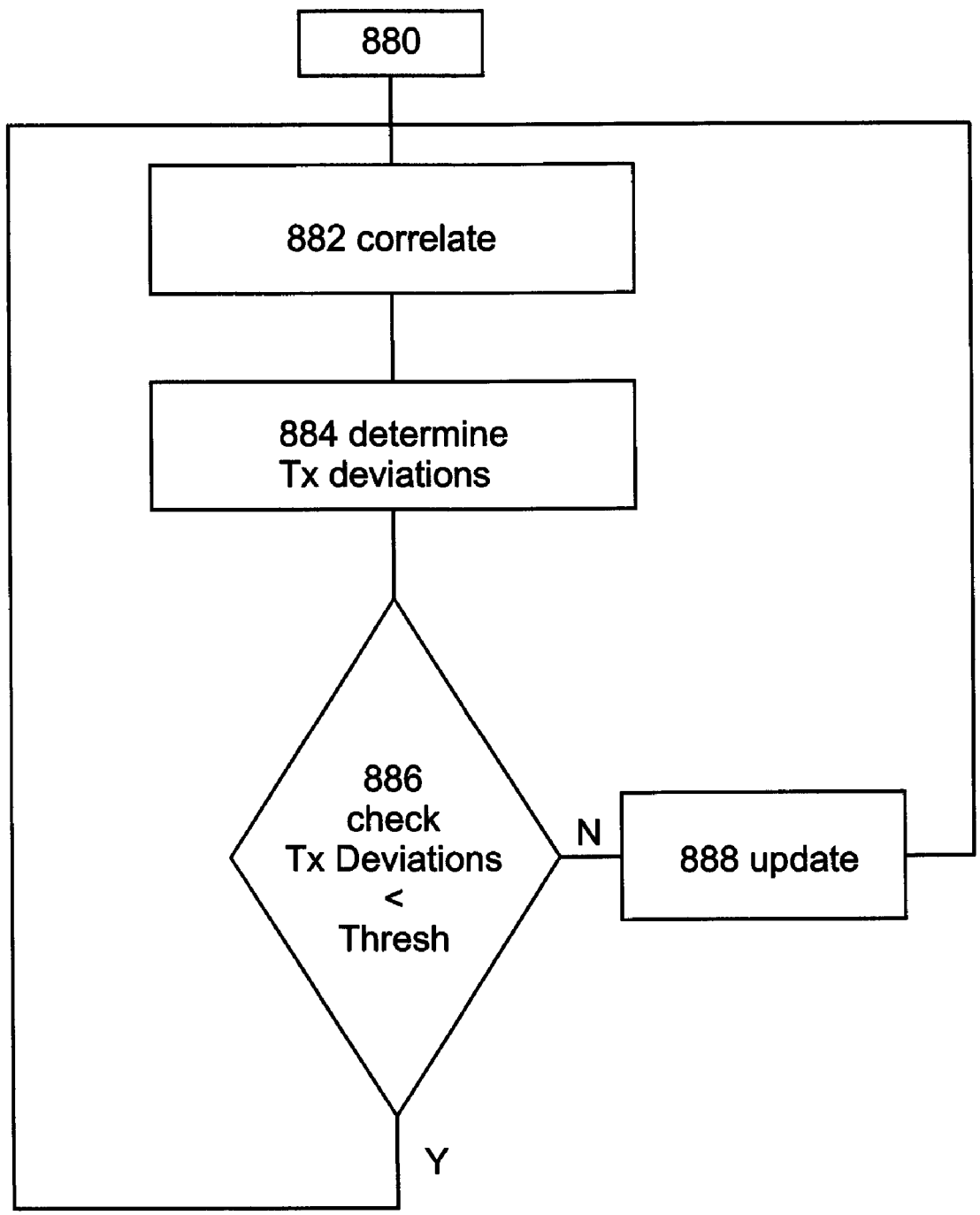
FIG. 3e shows a flow chart illustrating a step of updating the phase and amplitude changes.

FIG. 3e shows details of the step 880 of updating the phase and amplitude changes 210-1, 210-2, . . . , 210-N. A step 882 comprises correlating the payload signal 10 and the base band feedback signal 90B. The step 882 of correlating may be implemented using the first correlator 245a and the second correlator 245b. In a step 884 transmit deviations 90T are derived form the signals correlated in the step 882. In a step 886 it is checked if the transmit deviations 90T are below a predefined threshold. In case the transmit deviations 90T are below the predefined threshold the method 800 returns to the step 882. In case the transmit deviations 90T are not below the predefined threshold in a step 888 an updating of the phase and amplitude changes 210-1, 210-2, . . . , 210-N is carried out, responsive to the transmit deviations 90T derived in the step 886. The updating 888 of the phase and amplitude changes 210-1, 210-2, . . . , 210-N is well known in the art and shall not be discussed any further.

The power measurement and the power calibrating were explained in FIG. 3c comprising one measurement of the first power sensor 500 and/or the second power sensor 500b. The full calibration of the power levels may comprise one or more iterations of the power calibrating as displayed, in particular when the attenuating properties of the switch 100 are to be measured with the radio system 1 as explained with respect to FIG. 1b.

It is to be understood that the method 800 has been explained for calibration of the phase and amplitude changes 210-1, 210-2, . . . , 210-N for an individual one of the transmit paths 70-1, 70-2 . . . , 70-N within FIGS. 3a-3d. Typically the radio system 1 requires several iterations of the method 800 as described for all the transmit paths 70-1, 70-2, . . . , 70-N to be calibrated.

While various aspects of the present invention have been described above, it should be understood that they have been presented by way of example, and not limitation. It will be apparent to persons skilled in the relevant arts that various changes in form and detail can be made therein without departing from the scope of the invention. For example, any bipolar transistors depicted in the drawings and/or described in the text could be field effect transistors, and vice versa. The resonators need not be a LC-type resonator, but also any other type of suitable resonator, such as a tank or a surface wave resonator. In addition to using hardware (e.g., within or coupled to a Central Processing Unit ("CPU"), microprocessor, microcontroller, digital signal processor, processor core, System on Chip ("SOC"), or any other device), implementations may also be embodied in software (e.g., computer readable code, program code, and/or instructions disposed in any form, such as source, object or machine language) disposed, for example, in a computer usable (e.g., readable) medium configured to store the software. Such software can enable, for example, the function, fabrication, modelling, simulation, description and/or testing of the apparatus and methods described herein. For example, this can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). The software can also be disposed as a computer data signal embodied in a computer usable (e.g., readable) transmission medium (e.g., carrier wave or any other medium including digital, optical, or analogue-based medium). Embodiments of the present invention may include methods of providing the apparatus described herein by providing software describing the apparatus and subsequently transmitting the software as a computer data signal over a communication network including the Internet and intranets.

It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

The invention claimed is:

1. A radio system adapted for relaying radio signals and providing a power measurement of transmit radio signals, the radio system, comprising:
    a calibration unit adapted to split a payload signal, thus producing a plurality of calibrated payload signals;
    a plurality of transmit paths for relaying the plurality of calibrated payload signals as transmit signals,
    a plurality of links adapted to forward the transmit signals to the plurality of transmit paths,
    a coupler adapted to extract coupled transmit signals from the transmit signals,
    a switch for individually selecting ones of the coupled transmit signals to form a feedback signal,
    a power sensor for monitoring a transmit power of a portion of a one of the coupled transmit signals,
    wherein a power output of at least one of the plurality of transmit paths is measurable in response to the transmit power of the portion of the one of the coupled transmit signals.

2. The radio system according to claim 1, wherein the power output of the at least one of the plurality of transmit paths is updateable in response to the transmit power of the portion of the one of the coupled transmit signals.

3. The radio system according to claim 1, wherein the calibration unit is further adapted to measure a transmit power ratio between ones of the plurality of transmit paths.

4. The radio system according to claim 1, wherein the calibration unit is adapted to apply phase and amplitude changes to at least one of the plurality of calibrated payload signals.

5. The radio system according to claim 1, comprising at least one second power sensor adapted to monitor a transmit power level of a second one of the coupled transmit signals.

6. The radio system according to claim 1, further comprising a calibration update module for updating the phase and amplitude changes in response to the feedback signal in a feedback path.

7. The radio system according to claim 6, further comprising a feedback signal demodulator adapted for generating a base band feedback signal in response to receiving the feedback signal.

8. The radio system according to claim 7, wherein the updating of the phase and amplitude changes comprises using a correlation of the payload signal and the base band feedback signal.

9. The radio system according to claim 1, wherein at least one of the plurality of transmit paths is terminated by an antenna element.

10. The radio system according to claim 1, further comprising a feedback signal demodulator adapted to receive the feedback signal.

11. The radio system according to claim 1, wherein at least one of the plurality of links introduces a link phase and amplitude deviation to the transmit signal.

12. The radio system according to claim 1, wherein at least one of the plurality of transmit paths further comprises a digital to analogue converter.

13. The radio system according to claim 12, wherein the digital to analogue converter comprises a sigma delta digital to analogue converter.

14. The radio system according to claim 1, wherein at least one of the plurality of transmit paths further comprises an amplifier for amplifying the transmit signal.

15. The radio system according to claim 1, wherein at least one of the plurality of transmit paths further comprises a filter for filtering the transmit signal.

16. The radio system according to claim 15, wherein the filter comprises a duplex filter.

17. The radio system according to claim 1, further comprising a splitter adapted to extract the portion from the coupled transmit signal.

18. The radio system according to claim 17, wherein at least one of the following elements is implemented on a chip: the calibration unit, the calibration update module, the digital to analogue converter, the feedback signal demodulator, the splitter, the power sensor and the feedback path.

19. The radio system according to claim 18, wherein the chip comprises a digital signal processor (DSP).

20. A method for relaying radio signals providing a power measurement of transmit signals, the method comprising:
    providing a payload signal,
    generating a plurality of calibrated payload signals from the payload signal to produce a plurality of transmit signals,
    forwarding the plurality of transmit signals,
    selecting individually ones of the plurality of transmit signals
    power measuring at least one of the transmit signals, wherein the power measuring is in response to a portion of the selected one of the plurality of transmit signals.

21. The method according to claim 20, wherein the forwarding of the plurality of transmit signal further comprises:
    forwarding the plurality of calibrated payload signals along at least one link to at least one transmit path,
    relaying the plurality of calibrated payload signal as transmit signals along the at least one transmit path,
    digital to analogue converting the transmit signals, amplifying the transmit signals,
filtering the transmit signals,
extracting coupled ones of the transmit signals from the at least one transmit path.

22. The method according to claim 20, wherein the power measuring further comprises:
extracting the portion of the selected one of the transmit signals,
measuring a transmit power level for the portion of the selected one of the transmit signals.

23. The method according to claim 22, wherein the power measuring further comprises:
checking a state of transmit power levels in response to the measuring of the transmit power, and updating gains for the transmit paths in response to the checking of the state, and
generating a warning in case the checking of the state is negative.

24. The method according to claim 20, further comprising:
feeding back the selected one of the transmit signals as a feedback signal,
updating phase and amplitude changes in response to the feedback signal.

25. The method according to claim 24, wherein the feeding back of the selected one of the transmit signals as the feedback signal comprises:
filtering the feedback signal.

26. The method according to claim 24, wherein the updating of the phase and amplitude changes comprises:
correlating the payload and the base band feedback signal,
extracting transmit deviations,
checking whether the transmit deviations are above a threshold value, and
updating the phase and amplitude changes responsive to the checking.

27. The method according to claim 24, wherein the feeding back of the selected one of the transmit signals as the feedback signal further comprises:
receiving the selected one of the transmit signals as the feedback signal,
generating a base band feedback signal in response to the feedback signal.

* * * * *